United States Patent [19]
Mack et al.

[11] Patent Number: 4,742,614
[45] Date of Patent: May 10, 1988

[54] TURRET INCREMENTER

[76] Inventors: James F. Mack; Ernesto Velarde, both of 3695 E. Industrial Dr., Flagstaff, Ariz. 86002

[21] Appl. No.: 892,442

[22] Filed: Aug. 4, 1986

[51] Int. Cl.⁴ .................. B23P 21/00; B23B 7/04
[52] U.S. Cl. .................. 29/785; 29/48.5 R; 74/813 R; 74/813 C; 74/817
[58] Field of Search .............. 29/48.5 R, 48.5 A, 785; 408/35; 74/816, 817, 813 R, 813 C, 822, 826, 88, 128

[56] References Cited

U.S. PATENT DOCUMENTS

| | | | |
|---|---|---|---|
| 3,552,220 | 1/1971 | MacDermod | 74/817 |
| 3,965,775 | 6/1976 | Pinkesfeld | 74/816 |
| 4,476,735 | 10/1984 | Cantwell | 74/84 R |

Primary Examiner—P. W. Echols
Attorney, Agent, or Firm—Nissle & Leeds

[57] ABSTRACT

Apparatus for incrementally altering the position of an object. The apparatus incrementally rotatably advances a turret by sequentially displacing a plurality of plungers. Each plunger when displaced moves along a linear axis to slidably contact and move along a sloped surface on the turret to generate a lateral force which incrementally rotates the turret a desired distance.

5 Claims, 2 Drawing Sheets

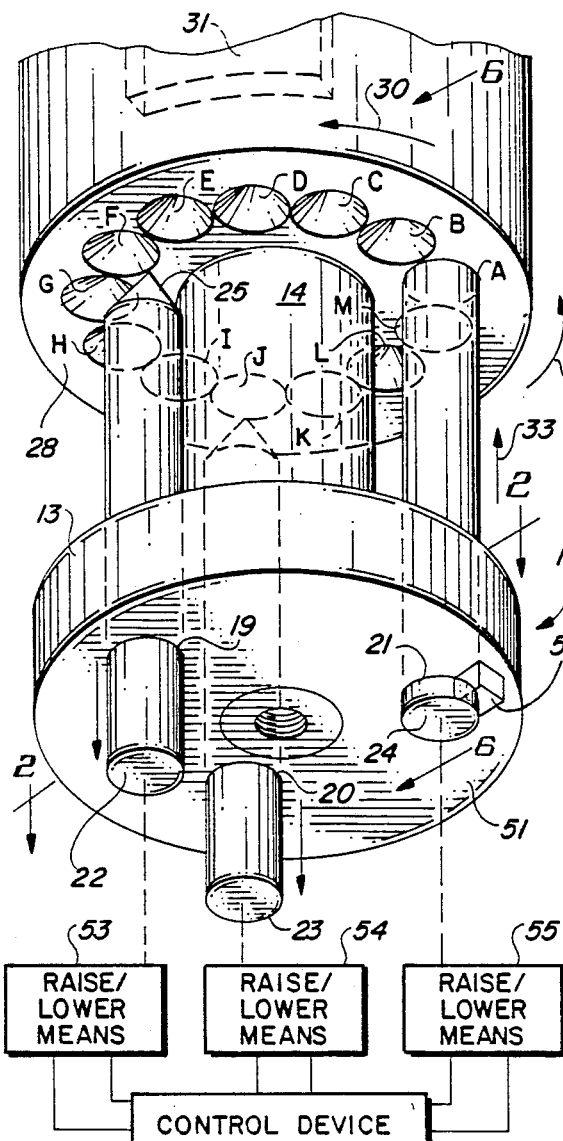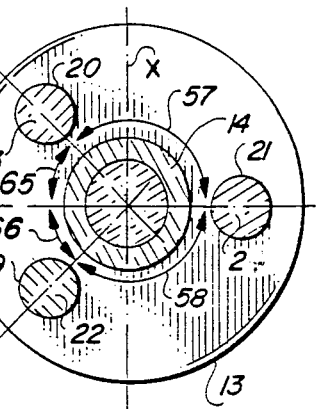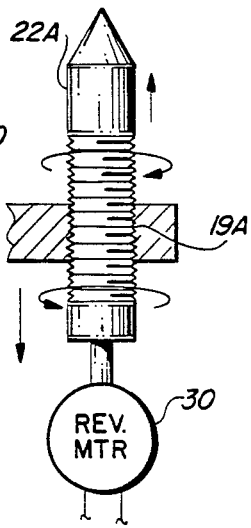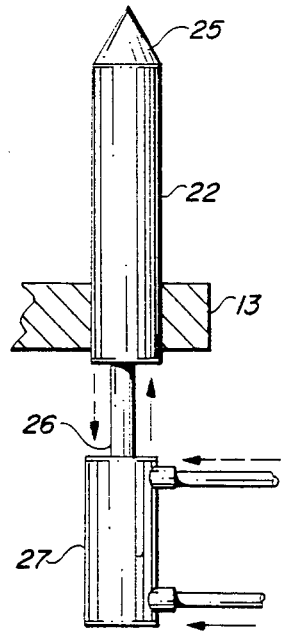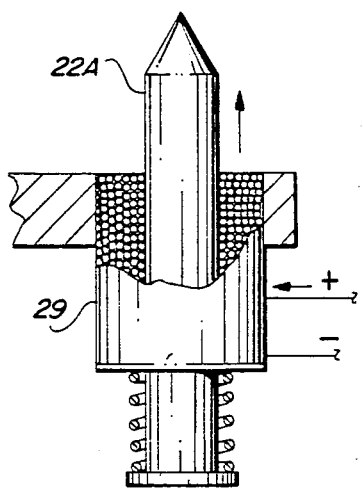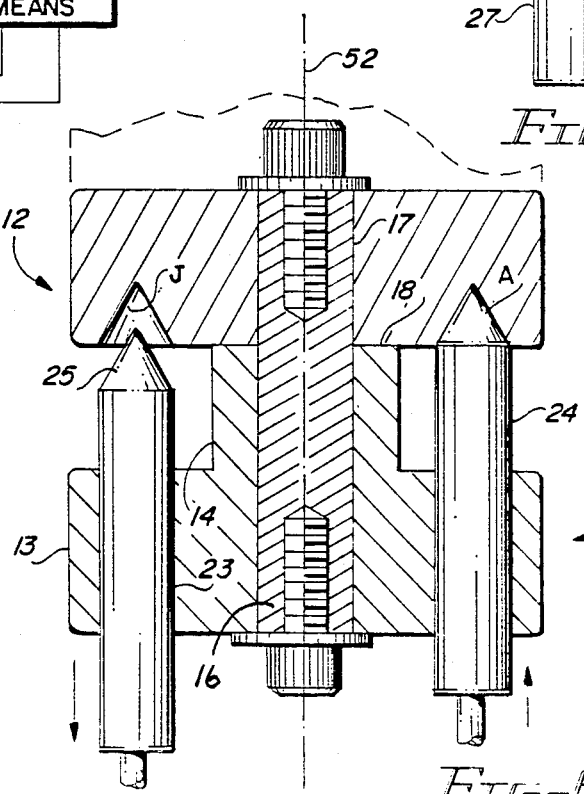

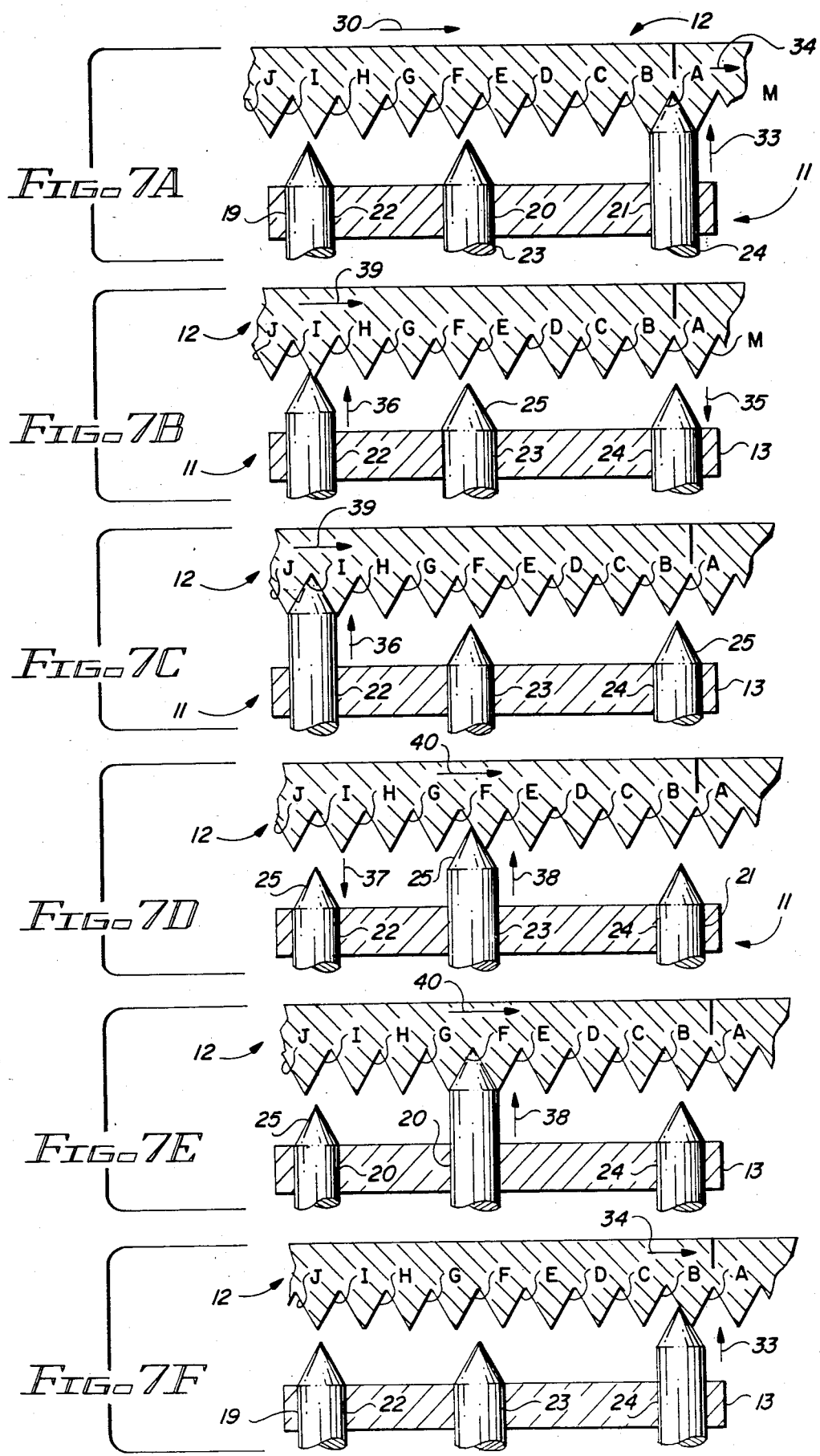

TURRET INCREMENTER

This invention relates to apparatus for incrementally altering the position of an object.

More particularly, the invention relates to apparatus which incrementally rotatably advances a turret by sequentially displacing a plurality of plungers, each plunger when displayed moving along a liner axis to slidably contact and move along a sloped surface on the turret to generate a lateral force which incrementally rotates the turret a desired distance.

In another respect, the invention relates to apparatus of the type described in which the distance each plunger slides along a sloped surface on the turret is automatically limited by the plunger's fitting into a stop aperture which halts the sliding contact of the plunger along the sloped surface and halts rotation of the turret.

In a further respect, the invention relates to apparatus which can mechanically incrementally displace a turret a desired distance along an arc with a high degree of accuracy.

Robotics systems are well known in the art and often include apparatus for rotatably advancing through an arc a turret and a robotics action assembly mounted on the turret. The robotics action assembly is utilized to accomplish an operation on or in conjunction with an object or device. Pincers, lasers, inscription apparatus and sensors are examples of robotics action assemblies. In the operation of robotics systems, it is desirable to be able to repeatedly rapidly accurately incrementally and decrementally vary the position of a rotatable turret and the robotics action assembled carried on the turret. Rotatably varying the position of a turret can be accomplished with a computer controlled servomechanism which "hunts" and by trial and error rotates a turret and its associated action assembly to a desired position. While servomechanisms can accurately position a rotating turret, their complexity fosters maintenance problems. In addition, the cost of microprocessor controlled servomechanisms is often prohibitive.

Accordingly, it would be highly desirable to provide improved apparatus of simple mechanical construction and operation which would, without requiring computer control, accurately rapidly automatically incrementally and decrementally rotatably vary the position of a turret and robotics action assembly mounted on the turret.

Therefore, it is an object of the invention to provide improved robotics apparatus for incrementally and decrementally displacing along an arc a robotics action assembly.

A further object of the invention is to provide improved apparatus which, without requiring the utilization of a microprocessor or other electronic control unit, incrementally alters the position of a robotics action assembly along an arc.

Another object of the instant invention is to provide improved apparatus for incrementally altering the position of a robotics action assembly along an arc by sequentially slidably contacting a plurality of sloped surfaces on the apparatus to generate lateral forces which rotatably displace the robotics action assembly.

Yet another object of the invention is to provide improved apparatus for mechanically incrementally displacing a robotics action assembly along an arc or straight line, the apparatus including a stop mechanism which automatically halts movement of the robotics action assembly after the assembly has been displaced a selected distance.

These and other, further and more specific objects and advantages of the invention will be apparent to those skilled in the art from the following detailed description thereof, taken in conjunction with the drawings, in which:

FIG. 1 is a perspective view illustrating apparatus constructed in accordance with the principles of the invention;

FIG. 2 is a section view further illustrating the construction of the apparatus of FIG. 1 and taken along section line 2—2 thereof;

FIG. 3 is a front view illustrating a plunger of the apparatus of FIG. 1 provided with means for upwardly and downwardly displacing the plunger;

FIG. 4 is a front view illustrating a plunger of the apparatus of FIG. 1 provided with alternate means for upwardly and downwardly displacing the plunger;

FIG. 5 is a front view illustrating a plunger of the apparatus of FIG. 1 provided with still other alternate means for upwardly and downwardly displacing the plunger;

FIG. 6 is a front section view further illustrating interior construction details of the apparatus of FIG. 1 and taken along section line 6—6 thereof; and, FIGS. 7A–7F are schematic views of the apparatus of FIG. 1 illustrating the mode of operation thereof.

Briefly, in accordance with our invention, we provide improved apparatus for incrementally advancing an object. The apparatus includes a base member; a turret mounted on the base member for rotation about an axis and including a plurality of surfaces formed on the turret and sloped with respect to the axis of rotation of the turret, the object being mounted on the turret; a plurality of plungers each having a tip and movable between at least two operative positions, a first normal operative position with the tip spaced away from the turret and sloped surfaces, and a second operative position with the plunger displaced to contact the tip with one of the sloped surfaces to generate a lateral force to rotate the turret about the axis. The sloped surfaces are positioned on the turret such that after one of the plungers is displaced to the second operative position to contact a selected one of the surfaces and rotate the turret and is then moved from the second operative position to the first operative position, and another of the plungers is displaced to the second operative position to slidably contact another selected one of the surfaces, the another plunger contacts the another selected one of the surfaces and generates a force against the another sloped surface causing the turret to rotate on the base.

Turning now to the drawings, which depict the presently preffered embodiments of the invention for the purpose of illustrating the practice thereof and not by way of limitation of the scope of the invention, and in which identical reference characters represent corresponding elements throughout the several views, FIGS. 1, 2 and 6 illustrate apparatus constructed in accordance with the invention and including a turret 12 rotatably mounted on a base 11. Turret 12 rotates about axis 52. Base 11 includes cylindrical member 13 having upwardly depending cylindrical neck 14 secured thereto. Cylindrical aperture 17 fixedly receives elongate rod 16. Aperture 17 formed through the base of turret 12 slidably receives the upper end of rod 16 such that turret 12 can freely rotate about rod 16 and over upper surface 18 of neck 14. Cylindrical apertures 19-21 in member 13 slidably receive cylindrical plungers 22-24, respectively, for linear reciprocating movement therein. Each plunger 22-24 includes a conical tip 25. Tip 25 can, instead of being conical, be spherical or any other desired shape. Conical apertures A-M are formed in circular lower surface 28 of turret 12. Plungers 22-24 are each operatively associated with means 53-55 for raising and lowering the plungers, respectively. The raise/lower means 53-55 are operated by control device 56. Plungers 22-24 are each preferably fixedly attached to a rod 26 in the manner illustrated in FIG. 5. Rod 26 is adapted to operated in conjunction with a hydraulic unit 27 to upwardly and downwardly displace a plunger 22-24. A plunger 22A can also be upwardly and downwardly displace utilizing a solenoid 29 in the manner illustrated in FIG. 3, or by externally threading a plunger 22A and internally threading an aperture 19A in the manner illustrated in FIG. 4. When a threaded plunger is utilized, a reversible motor 30 turns plunger 22A through threaded aperture 19A to raise and lower plunger 22A.

In FIG. 1 dashed lines 31 represent a robotics action mechanism mounted on turret 12. Mechanism 31 can be a pincer, laser, inscription device, sensor or other object or device utilized to accomplish an operation on or in conjunction with another object or device. Robotics action assemblies are commonly utilized to preform operations on circuit boards, machine parts, fabrics, etc.

Operation of the incrementing apparatus of the invention is illustrated in FIGS. 1, 6 and 7A-7F. In FIGS. 7A to 7F, the circle pattern of apertures A-J in surface 28 and the plungers 22-24 are shown in planar linear view to facilitate explanation of the operation of the apparatus of the invention. Turret 12 is incrementally rotated in the direction of arrows 30 by sequentially upwardly and downwardly displacing plungers 22-24. A cycle of the sequential upward and downward displacement of plungers 22-24 is illustrated in FIGS. 7A-7F.

In FIG. 7A, tip 25 of plunger 24 is shown in its greatest reach of upward travel in the direction of arrow 33, with tip 25 fully seated in conical aperture A. When tip 25 is seated in aperture A, plunger 24 is prevented from being upwardly displaced in the direction of arrow 33. When plunger 24 is upwardly displaced in the direction of arrow 33, tip 25 slidably contacts the inner sloped conical surface of aperture A and produces a lateral force 34 which causes turret 12 to rotate in the direction of arrows 30 in FIGS. 1 and 7A.

In FIG. 7B, plunger 24 has been retracted in the direction of arrow 35. After plunger 24 is retracted from aperture A, plunger 22 is upwardly displaced in the direction of arrow 36. As is illustrated in FIG. 7B, the tip 25 of plunger 22 initially contacts the inner conical surface of aperture I near the circular edge defining the mouth of aperture I. After tip 25 of plunger 22 initially contacts the inner conical surface of aperture I, plunger 22 continues to be upwardly displaced such that tip 25 slides upwardly over the conical surface of aperture I and generates a lateral force 39 which rotates turret 12 in the direction of arrows 30 in FIG. 1. As tip 25 slides upwardly into aperture I, the proportion of the conical surfaces area of tip 25 contacting the conical surface of aperture I increases. When the surface area of tip 25 contacting aperture I increases, the lateral force 39 generated is distributed over a larger area of the surface of aperture I and of the surface of tip 25. This tends to minimize wear and extend the operational life of the apparatus.

In FIG. 7C, plunger 22 has completed its upward displacement and tip 25 of plunger 22 is fully seated in conical aperture I. During operation of the apparatus of the invention, base member 11 remains in fixed position while plungers 22-24 are sequentially upwardly and downwardly displaced through apertures 19-21 and turret 12 is incrementally rotated on rod 16 and surface 18 of neck 14.

After plunger 22 has completed its upward movement, it is lowered in the direction of arrow 37 in FIG. 7D. After plunger 22 is retracted in the direction of arrow 37, plunger 23 is upwardly displaced in the direction of arrow 38. While plunger 23 is being upwardly displaced, the tip 25 of plunger 23 initially contacts the inner sloped conical surface of aperture F near the circular mouth of aperture F as illustrated in FIG. 7D. As the upward displacement of plunger 23 in the direction of arrow 38 continues, tip 25 of plunger 23 slides upwardly over the inner sloped conical surface of aperture F and generates a lateral force 40 which rotates turret 12 in the direction of arrows 30 in FIG. 1.

In FIG. 7E, plunger 23 has completed its upward displacement, and tip 25 is fully seated in aperture F. While tip 25 of plunger 23 moves upwardly from the position shown in FIG. 7D to the position shown in FIG. 7E, it generates lateral force 40 which rotates turret 12 in the direction of arrows 30 in FIGS. 1 and 7A.

After plunger 23 completes its upward displacement, it is retracted to the position shown in FIG. 7F, and plunger 24 is again upwardly displaced by raise/lower means 55 until tip 25 of plunger 24 initially contacts the inner sloped conical surface of aperture B near the circular mouth of aperture B. The upward displacement of plunger 24 is continued until tip 25 of plunger 24 fully seats in aperture B. Plunger 24 is then retracted by raise/lower means 55 and plungers 22 and 23 are again sequentially activated by raise/lower means 53, 54 in the manner described above.

In the drawings, apertures A to M are shown immediately adjacent one another. The number of apertures and spacing between the apertures can be varied as desired. Any number of plungers in excess of two can be utilized in the practice of the invention. The shape and dimension of apertures A to M and of tip 25 of each plunger can be varied as desired as long as when the tip 25 of a plunger 22-24 is upwardly displaced into sliding contact with an aperture A to M, a lateral force is generated which displaces turret 12 in the direction of arrow 30 or in a direction opposite that indicated by arrow 30.

Apertures A to M and plungers 22-24 can be positioned with respect to one another to incrementally rotate turret 12 in a clockwise direction, or can be positioned to rotate turret 12 in a counterclockwise direction.

In the presently preferred embodiment and best mode of the invention illustrated in FIGS. 1, 2, 5, 6 and 7, each plunger is sequentially upwardly displaced until the tip 25 of the plunger 22-24 fully seats in an aperture A to M. Each plunger does not have to be upwardly displaced to seat in an aperture A to M, but can, after the tip 25 of the plunger initially contacts the inner conical surface of an aperture A to M, be moved upwardly any desired distance and then retracted prior to seating of tip 25 in the aperture A to M. Moving a plunger upwardly until the tip 25 of the plunger seats in an aperture A to M provides, however, a convenient method of accurately controlling the incremental distance a plunger 22-24 rotates turret 12 and of controlling the distance a plunger 22-24 is upwardly displaced. Various other means of controlling the distance a plunger 22-24 is upwardly displaced and of controlling the distance the plunger advances turret 12 can be utilized. For example, a stop 50 (FIG. 1) fixedly secured to a plunger 24 can contact bottom surface 51 of base 11 and limit the upward displacement of the plunger.

Apparatus constructed in accordance with the invention can be used to rotatably advance a turret in the manner shown 12 or can be utilized to linearly advance a carriage mechanism.

In FIG. 2, angles 65 and 66 each equal 50°. This amendment is necessary for the specification to correspond to the drawings changes required by the Examiner. The drawings are being amended by Patent Reproduction Company. Angles 57 and 58 each equal 130°.

Having described our invention in such terms as to enable those skilled in the art to understand and practice it, and having identified the presently preferred embodiments thereof, we claim:

1. Apparatus for incrementally advancing an object carried thereon, said apparatus including
   (a) a base member;
   (b) a turret mounted on said base member for rotation about an axis and including at least three spaced apart sloped surfaces formed on said turret, said object being mounted on said turret;
   (c) three plungers each having an elongate axis centerline and a tip and movable along said centerline between at least three operative positions,
      (i) a first normal operative position with said tip spaced away from said turret and sloped surfaces,
      (ii) a second operative position with the tip of said plunger first contacting said turret at a point on one of said sloped surfaces, said plunger being displaced along said centerline in a first direction of travel from said first to said second operative position, said first direction of travel being parallel to centerline,
      (iii) a third operative position with the tip of said plunger continuing to contact said one of said sloped surfaces, said plunger moving said first direction of travel from said second operative position to said third operative position such that said tip slidably moves over said sloped surface to generate a lateral force to rotate said turret about said turret axis in a third direction of travel, said plunger moving from said third to said first operative position in a second direction of travel opposed to said first direction of travel, said surfaces being sloped with respect to said turret axis and said centerlines of said plungers;
   (d) means for movably mounting said plungers to move between said three operative positions and separately contact in a selected sequence said surfaces and produce lateral forces to rotate said turret in said third direction of travel;

said sloped surfaces being spaced apart on said turret such that after one of said plungers is displaced in said first direction of travel from said first to said third operative position to slidably contact a selected one of said surfaces and rotate said turret in said third direction of travel, the remaining two of said plungers are spaced away from said surfaces, and said centerline of the next of said remaining plungers to sequentially contact said turret extends through one of said surfaces other than said selected one of said sloped surfaces.

2. The apparatus of claim 1 wherein each of said sloped surfaces comprises an aperture conforming to said tips of said plungers.

3. The apparatus of claim 2 wherein said tip of a plunger is fully seated in one of said apertures when said plunger is in said third operative position.

4. The apparatus of claim 3 wherein said sequence of movement of said plungers may be, without rotating said plungers about said centerlines, altered to cause said turret to rotate in a direction opposite said third direction of travel.

5. The apparatus of claim 1 wherein said sequence of movement of said plungers may be, without rotating said plungers about said centerlines, altered to cause said turret to rotate in a direction opposite said third direction of travel.

* * * * *